US008678732B2

(12) United States Patent
Balbo Di Vinadio

(10) Patent No.: US 8,678,732 B2
(45) Date of Patent: Mar. 25, 2014

(54) SYSTEM FOR FIXING ACCESSORIES ON FRAMES MADE OF METAL MATERIAL FOR DOORS, WINDOWS, AND THE LIKE

(75) Inventor: Aimone Balbo Di Vinadio, Turin (IT)

(73) Assignee: SAVIO S.p.A., Chiusa San Michele (Turin) (IT)

( * ) Notice: Subject to any disclaimer, the term of this patent is extended or adjusted under 35 U.S.C. 154(b) by 126 days.

(21) Appl. No.: 13/349,131

(22) Filed: Jan. 12, 2012

(65) Prior Publication Data

US 2012/0177461 A1 Jul. 12, 2012

(30) Foreign Application Priority Data

Jan. 12, 2011 (IT) .............................. TO2011A0008

(51) Int. Cl.
*F16B 25/00* (2006.01)

(52) U.S. Cl.
USPC .......................................... 411/386; 411/411

(58) Field of Classification Search
USPC .............................................. 411/386, 387.4
See application file for complete search history.

(56) References Cited

U.S. PATENT DOCUMENTS 2,292,195 A * 8/1942 Brown .......................... 411/386
3,812,639 A * 5/1974 Sygnator .................... 403/408.1
4,269,902 A * 5/1981 Sygnator ........................ 428/577
4,477,217 A * 10/1984 Bonacorsi .................. 411/387.4
4,486,135 A * 12/1984 Kazino .......................... 411/411
5,141,376 A * 8/1992 Williams et al. ........... 411/387.4
5,234,301 A * 8/1993 Grossberndt et al. ......... 411/386
5,772,374 A * 6/1998 Ide et al. ....................... 411/386
6,494,656 B1 * 12/2002 Boyer et al. .................. 411/399
6,945,729 B2 * 9/2005 Yasuda ...................... 403/408.1
7,014,386 B1 * 3/2006 Mullet et al. .................. 403/362

FOREIGN PATENT DOCUMENTS

EP 2 218 854 A2 8/2010
WO WO 2006/042592 A2 4/2006

OTHER PUBLICATIONS

Italian Search Report for corresponding priority application No. TO2011A000008, completed on Sep. 27, 2011.

* cited by examiner

*Primary Examiner* — Gary Estremsky
(74) *Attorney, Agent, or Firm* — Heslin Rothenberg Farley & Mesiti P.C.; Victor A. Cardona, Esq.

(57) ABSTRACT

A system for fixing an accessory on a metal frame for doors, windows, and the like, includes a screw having a head and a self-tapping threaded stem with metric thread, the end of which opposite to the head is tapered. A ratio between the external diameter of the self-tapping stem of the screw and the diameter of the through hole of the wall of the frame is approximately between 1.4 and 1.25, and the ratio between the diameter of the through hole of said wall and its thickness is approximately between 2.5 and 5.5 and more preferably between 3 and 5.

17 Claims, 5 Drawing Sheets

SYSTEM FOR FIXING ACCESSORIES ON FRAMES MADE OF METAL MATERIAL FOR DOORS, WINDOWS, AND THE LIKE

CROSS REFERENCE TO RELATED APPLICATIONS

This application claims priority to Italian Patent Application No. TO2011A000008 filed on Jan. 12, 2011, the entire disclosure of which is incorporated herein by reference.

FIELD OF THE INVENTION

The present invention relates to systems for fixing accessories, for example hinges, on frames of doors, windows, or the like.

STATE OF THE ART

Currently, systems for fixing hinges to the metal frames of doors, windows, and the like with front application are obtained using three different systems.

A first system envisages the use of counterplates, which are inserted in the cavity of the sectional element of the frame and screwed on which are screws with metric thread. The advantage of this system is to enable installation of the hinges both on ordinary sectional elements and on thermally cut sectional elements. In some cases, given that it is possible to distribute the stresses over a fixing surface even of different dimensions, it is possible to obtain a considerable solidity, which enables the maximum load-bearing capacities to be achieved. In the case of extruded sectional elements made of aluminium or its alloys said system moreover enables installation of the hinge in a way independent of the thickness of the extrudate.

However, this first system entails the drawback of rather long installation times, in so far as it requires insertion of the counterplates within the cavity of the sectional element. In addition, the counterplates do not enable the possible addition of a hinge when the frame is installed in so far as the cavity that receives the counterplate remains occluded. A further complication regards fixing of the hinge on thermally cut sectional elements designed for doors and windows that give out onto the outside of the building. In this case, the morphology of the extrudate is such that in practically all the sectional elements the installation of the hinge is more complicated still: in fact, the counterplate is inserted in the cavity of the sectional element not in contact with the hinge, requiring complementary accessories that enable thereof fixing but that markedly penalize the load-bearing capacity.

The second fixing system envisages use of anchor plugs, which are inserted within of previously made holes, and then screwed on said anchor plugs are metric screws. However, said fixing, albeit enabling fixing of the hinges also when the frame is installed, does not guarantee a high resistance to tearing and bending, thus penalizing the load-bearing capacity of the hinge. On the other hand, this system can be applied both on ordinary sectional elements and on thermally cut sectional elements.

The third system envisages the use of special screws that are screwed on the sectional element of the frame. In this case, application is possible only on thermally cut sectional elements, and the load-bearing capacity of the hinges is reduced in so far as the hinge looses stability and solidity. This system moreover requires a high precision in the drilling and screwing of the hinge on the sectional element: it is in fact very important to make the pre-hole in which the screw is screwed with the maximum precision, necessary for enabling optimal fixing. In addition, it is very important to respect the orthogonality of the screw with respect to the axis of the hole during screwing to prevent forcing of the thread. The positive aspects of this third system are the speed of installation of the hinges, and the possibility of fixing the hinges also when the frame is installed.

SUMMARY OF THE INVENTION

The object of the present invention is to provide an improvement to the fixing system of the third type referred to above and more in particular such as to prevent, unlike the fixing obtained with the use of the screws currently available on the market and thanks also to a peculiar conformation of the screw, a reduction of the load-bearing capacities of the hinges.

According to the invention, the above object is achieved thanks to a fixing system basically as defined in the characterizing part of claim 1, and more precisely in which:

- the self-tapping stem of the screw has a thread with constant pitch;
- the end of the self-tapping stem opposite to the head of the screw is tapered;
- the ratio between the external diameter of the self-tapping stem and the diameter of the through hole of the wall of the frame is comprised between about 1.4 and 1.25; and
- the ratio between the diameter of the through hole of said wall of the frame and the thickness of said wall is comprised about between 2.5 and 5.5 and more preferably between 3 and 5.

Thanks to this arrangement, a surprising effect is achieved deriving from the plastic deformation of the metal of the frame that not only increases the local thickness thereof around the hole but also enables elimination of any possible play between the screw and the hinge. When the screw is inserted through the hole of the accessory and then engaged with its tapered end in the hole of the frame, its thread, by opening its way against the internal wall of said hole, causes snagging thereof, i.e., an axial protrusion outwards, first on the side opposite to the accessory; then, after the tapered end of the self-tapping stem has completely traversed the hole, the cylindrical part of the stem produces an identical effect of snagging on the opposite side. In this way, at the end of screwing of the screw there is in practice generated a marked increase in thickness in the wall of the frame around the hole, which on the one hand prevents a decrease in the load-bearing capacity of the accessory, which is particularly advantageous in the case where the accessory is a hinge, and on the other elimination of any radial play between the screw and the accessory thanks to the creation of a sort of integral intermediate bushing within the hole of the accessory. A further advantage lies in the possibility of making the hole of the wall of the frame with less strict tolerances.

Said advantageous effects are further amplified in the case where the frame has a second wall with a second through hole and also a third wall with a third through hole, with the distance between the second wall and the first wall smaller than the length of the self-tapping stem of the screw, and with the distance between the first wall and the third wall substantially equal to the length of the self-tapping stem, decreased by the length of its tapered end. In this case, during screwing, the tapered end of the screw makes it possible to guide the alignment thereof through the hole of the second wall, and the hole of the third wall provides the final anchorage of the screw following upon engagement of said tapered end.

BRIEF DESCRIPTION OF THE DRAWINGS

Further characteristics and advantages of the invention will emerge clearly in the course of the ensuing detailed description, with reference to the annexed drawings, which are provided purely by way of non-limiting example and in which.

DETAILED DESCRIPTION OF THE INVENTION

Figure 1:
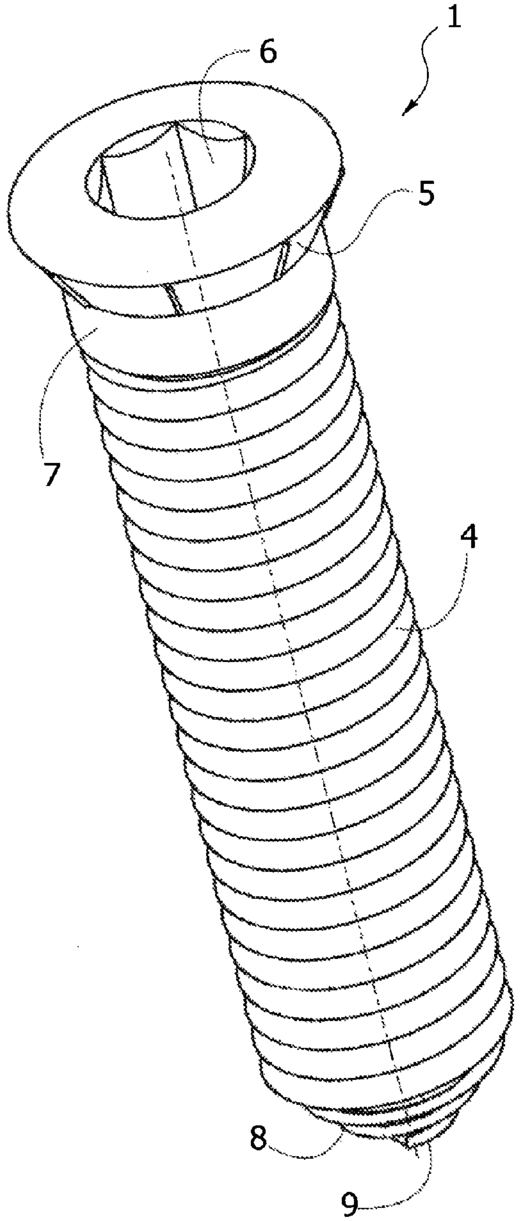
FIG. 1 is a schematic perspective view of an example of embodiment of the screw used in the fixing system according to the invention.
Figure 2:
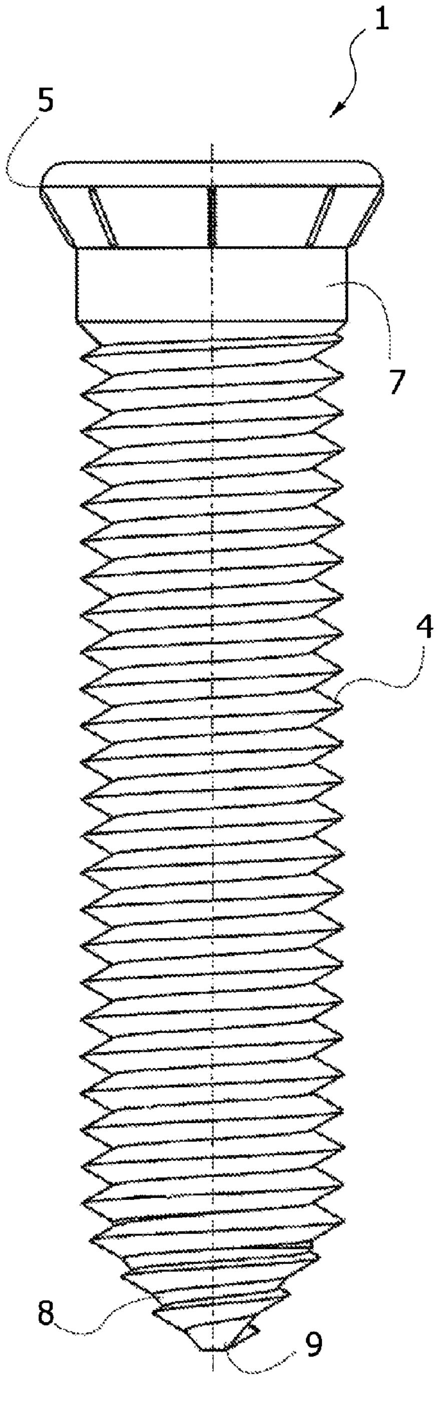
FIG. 2 is a view in elevation of the embodiment of FIG. 1.
Figure 3:
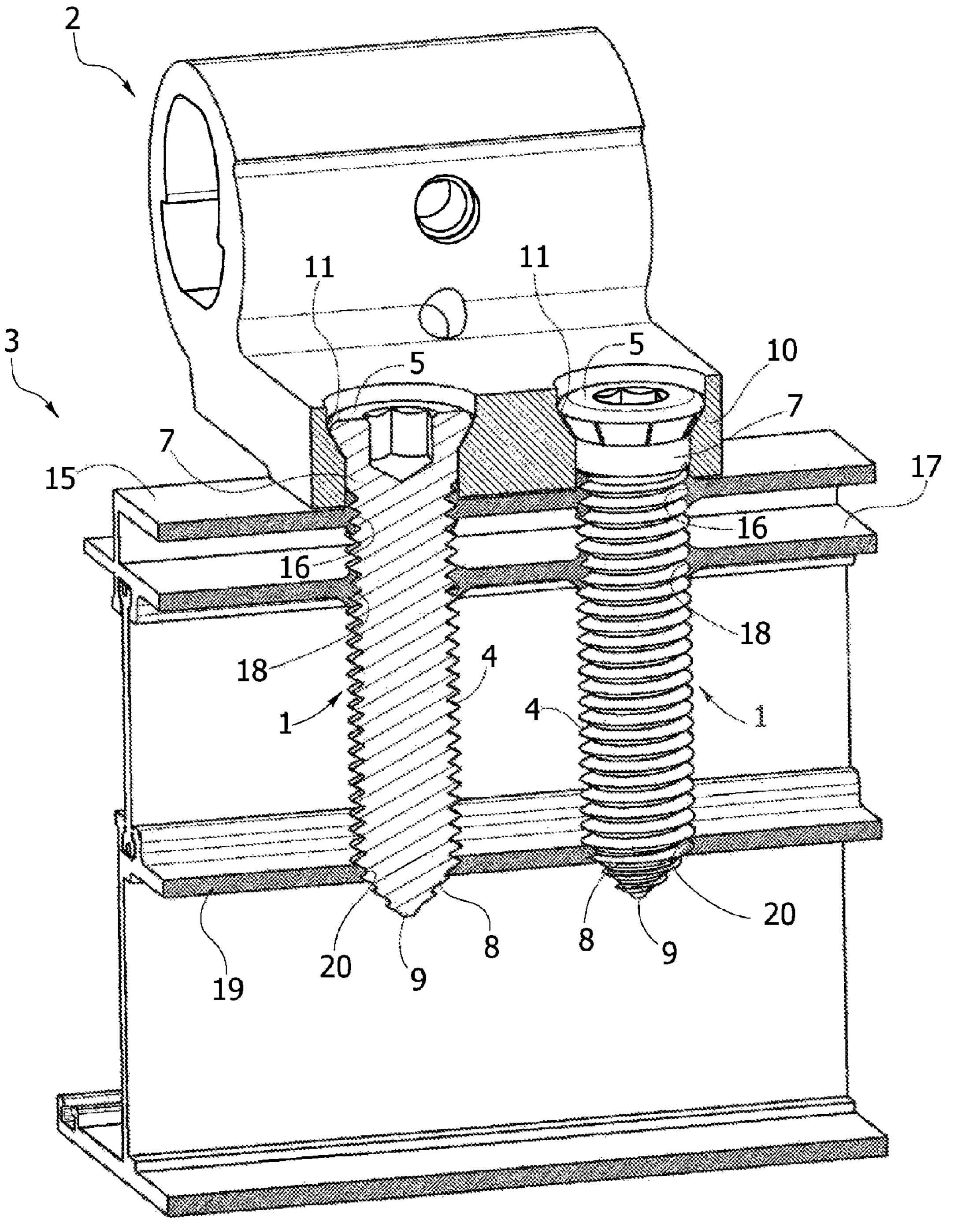
FIG. 3 is a partially sectioned schematic perspective view that exemplifies the fixing system according to the invention as a whole, specifically applied to the union between the frame of the leaf of a door or window and one of its hinges.
Figure 4:
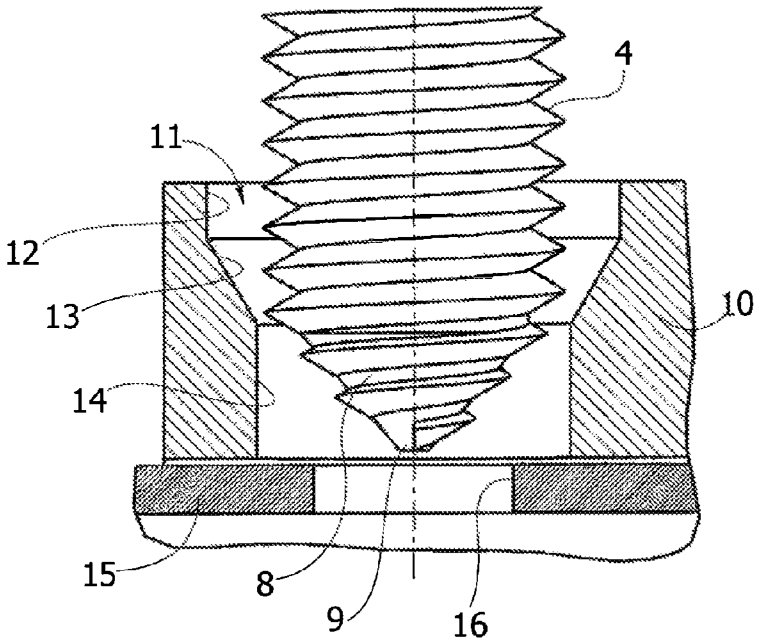
FIGS. 4 to 8 show schematically, at a larger scale and in partial cross section, application of the fixing system according to the invention in as many different successive steps.

With initial reference to FIGS. 1 and 2, designated by 1 is a screw designed to be used for fixing an accessory, for example a hinge (designated by 2 in FIG. 3) to the frame (designated by 3 in the same figure) of a door, window, or the like.

The frame 3 is formed, in a way in itself known, by elements typically made of aluminium or its alloys obtained, once again in a conventional way, by extrusion.

To return to FIGS. 1 and 2, the screw 1 consists in a self-tapping threaded stem 4, with metric thread with constant pitch comprised between 1.2 and 1.7 mm and preferably 1.5 mm, and with angle between the corresponding flanks of 60°.

The self-tapping stem 4 extends between a manoeuvring head 5 with conical outer surface having a hexagonal slot 6, and a tapered end 8 terminating with a tip 9. The head 5 is separated from the self-tapping stem 4 by a cylindrical centring stretch 7.

In the case of the application described herein, the self-tapping stem 4 of the screw 1 has an external diameter comprised between 8 and 12 mm and preferably substantially equal to 10 mm. The total length of the screw 1 can be in the region of 40-60 mm, preferably approximately 50 mm.

To return now to FIG. 3, the hinge 2 has a generally plane leaf 10, formed in which are two through holes 11 set at a distance from one another and each provided for insertion of a respective screw 1. As is illustrated in greater detail in FIGS. 4 to 8, each hole 11 has a widened initial stretch of a cylindrical shape 12 followed by an intermediate portion 13 with conical surface complementary to that of the head 5 of the screw 1 and by a final cylindrical portion 14 having a diameter slightly greater than that of the stem 4 of the screw 1.

The leaf 10 of the hinge 2 is set in contact with a first plane wall 15 of the frame 3 formed with a pair of through circular holes 16 (FIG. 4), each of which is coaxially aligned with a respective hole 11 of the leaf 10 of the hinge 2.

With the aforesaid diametral dimension of the stem 4, preferably comprised between 8 and 12 mm, the hole 16 has, according to the invention, a design diameter preferably in the region of 5-9 mm. Consequently, the ratio between the external diameter of the self-tapping stem 4 and the diameter of the through hole 16 is comprised, according to the invention, approximately between 1.4 and 1.25.

In this case, the thickness of the wall 15 of the frame 3 is comprised, according to the invention, between 1.5 and 2.5 mm, and preferably between 1.6 and 2.1 mm. Consequently, the ratio between the diameter of the through hole 16 and the thickness of the wall 15 is comprised approximately between 2.5 and 5.5, and more preferably between 3 and 5.

The frame 3 has a second plane wall 17 parallel to the wall 15 and set at a distance from the latter sensibly smaller than the length of the self-tapping stem 4 of the screw 1 and formed with a pair of through circular holes 18 aligned coaxially with the holes 16. The design diameter of the holes 18 and the thickness of the wall 17 are similar to those of the holes 16 and of the wall 15, respectively.

A third plane wall 19, parallel to the walls 15 and 17, is moreover formed in the frame 3 at a distance from the wall 15 substantially equal to the length of the self-tapping stem 4 of the screw 1 decreased by the length of its tapered end 8. The wall 19 is formed with a pair of through circular holes 20 coaxially aligned with the holes 16 and 18, and also in this case the diameter of the holes 20 and the thickness of the wall 19 are similar to those given previously with reference to the holes 16 and to the wall 15, respectively.

FIGS. 4 to 8 exemplify the successive steps of the process of fixing between the hinge 2 and the frame 3 as a result of screwing of one of the two screws 1. Obviously, what will be said applies identically also to the other screw 1.

Figure 5:
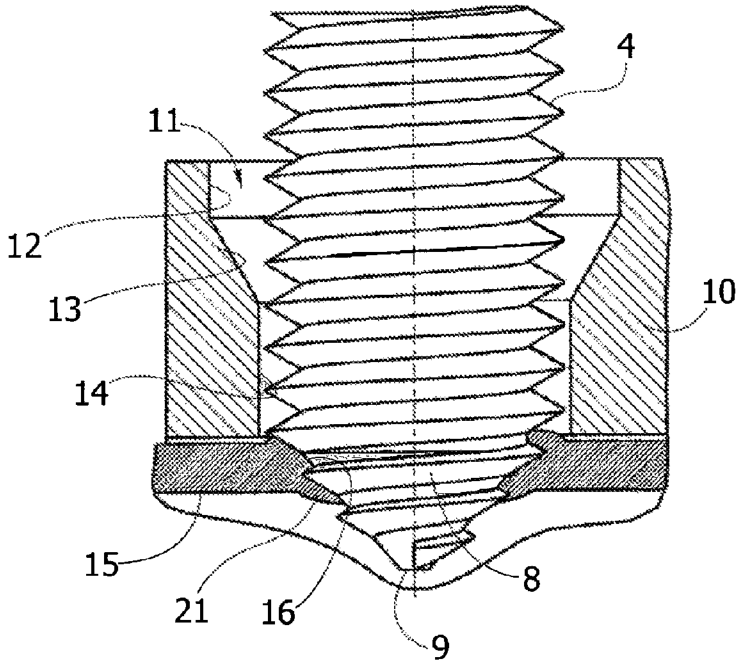
Figure 6:
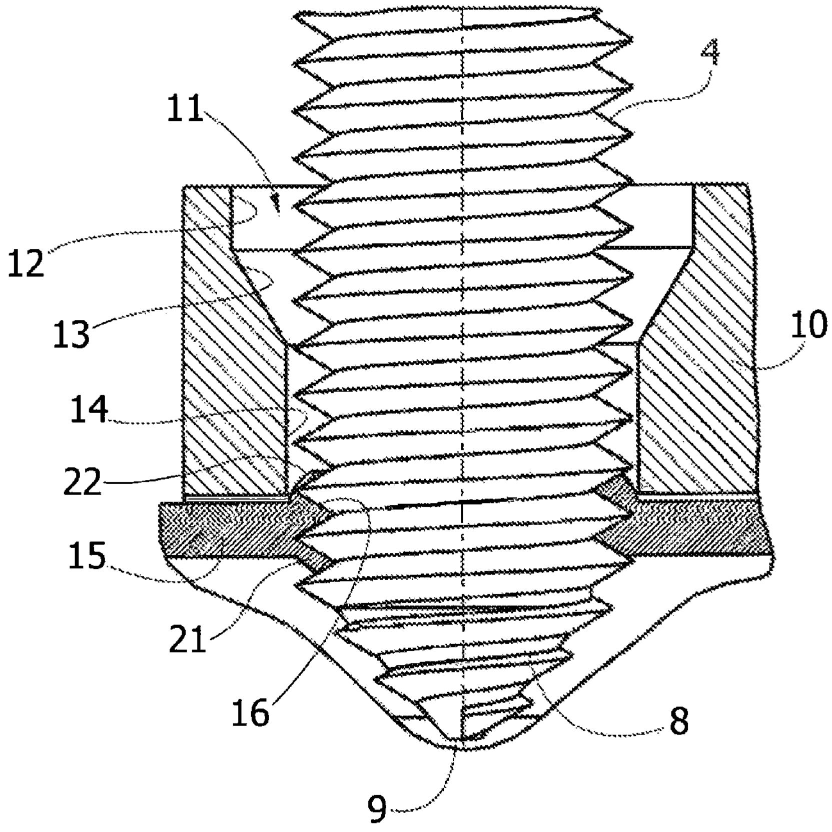
Figure 7:
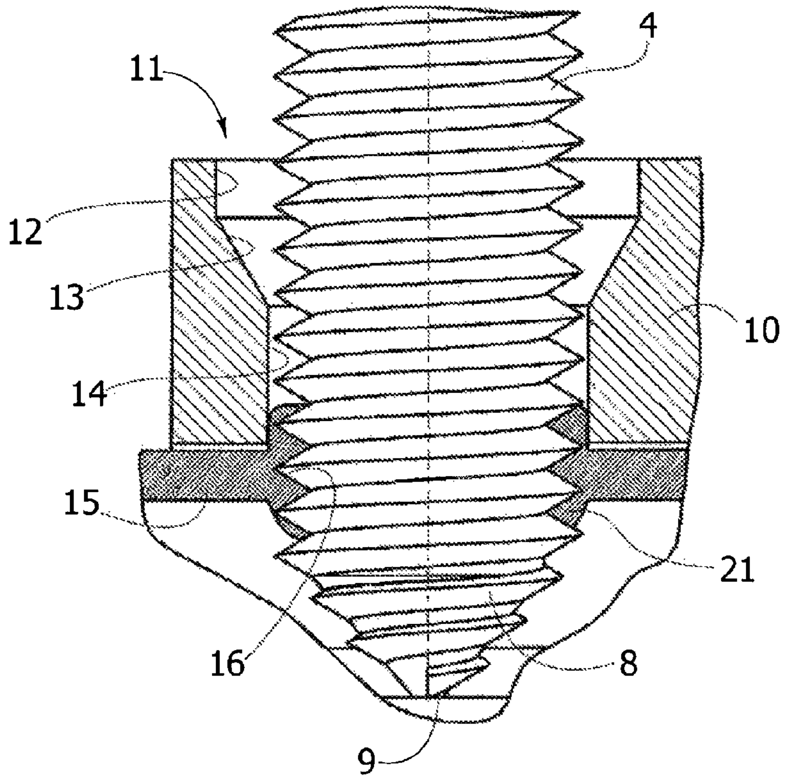

Initially (FIG. 4), the screw 1 is inserted with the tapered end 8 of its own self-tapping stem 4 into the hole 11, until it engages with the tip 9 through the hole 16 in the wall 15. In this step, the cylindrical terminal portion 14 of the hole 11 provides centring of the cylindrical terminal area of the self-tapping stem 4, whilst the tapered end 8 is screwed within the hole 16 (FIG. 5). During screwing of the tapered end 8, thanks to the peculiar ratios and dimensional parameters referred to above, the wall of the hole 16 undergoes plastic deformation initially generating a partial snag 21, i.e., an initial axial protrusion of the wall 15 on the side opposite to the leaf 10 of the hinge 2, which proceeds when the cylindrical part of the self-tapping stem 4 starts to open its way through the hole (FIG. 6). In there step, there is generated an initial snag 22 also on the side of the wall 15 facing the side of the leaf 10 of the hinge 2, which proceeds, widening, as screwing of the cylindrical part of the self-tapping stem 4 proceeds (FIG. 7).

The same effect is obtained during traversal of the hole 18 of the second wall 17 first by the tapered end 8 and then by the cylindrical portion of the self-tapping stem 4.

Figure 8:
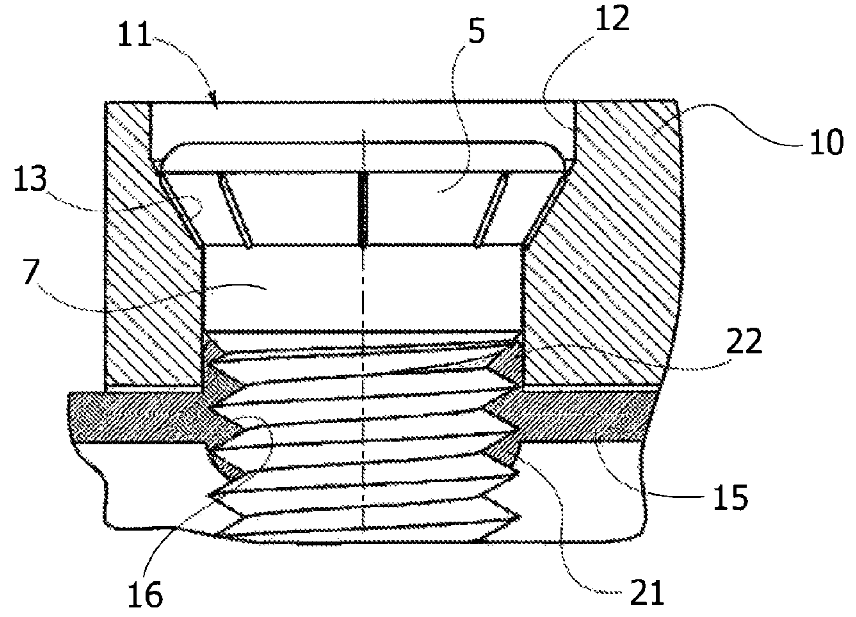

At the end of the screwing operation, i.e., when the head 5 of the screw 1 stops within the portion with conical surface 13 of the hole 11, the configuration of the wall 15 at the edge of the hole 16 is the one represented in FIG. 8: in practice, the thickness of the wall 15 in said annular area is increased, as a result of the snags 21 and 22, with respect to the initial value, which, as has been said, is, for example, comprised between 1.6 and 2.1 mm.

Dimensional tests conducted by the present applicant made it possible to determine that the increase, with a diameter of the cylindrical part of the self-tapping stem 4 of 10 mm, as has been said above, was the following:

- with the hole 16 having an initial diameter of 7 mm and initial thickness of the wall 15 of 1.6 mm, said thickness increases by 2.14 mm;
- with the hole 16 having an initial diameter of 7 mm and initial thickness of the wall 15 of 2.1 mm, said thickness increases by 2.68 mm;
- with the hole 16 having an initial diameter of 7.5 mm and initial thickness of the wall 15 of 1.6 mm, said thickness increases by 1.88 mm;
- with the hole 16 having an initial diameter of 7.5 mm and initial thickness of the wall 15 of 2.1 mm, said thickness increases by 1.96 mm;
- with the hole 16 having an initial diameter of 8 mm and initial thickness of the wall 15 of 1.6 mm, said thickness increases by 1.14 mm;

with the hole 16 having an initial diameter of 8 mm and initial thickness of the wall 15 of 2.1 mm, said thickness increases by 1.62 mm.

As may be seen, the most favourable situation corresponds to the initial diameter of the hole 16 of 7 mm.

The values indicated above apply also to the hole 18 of the second wall 17, whereas the values are obviously smaller for the hole 20 of the third wall 19, within which final engagement of the tapered end 8 of the screw 1 is obtained.

The advantages deriving from the snagging obtained thanks to the combined dimensional characteristics and shape of the screw, of the holes of the frame, and of the corresponding walls in which said holes are made are multiple. In the first place, the load-bearing capacity of the hinge is not reduced, and the radial play between the screw and the hinge is drastically reduced if not even eliminated. In addition, the dimensional tolerances of the holes of the frame are rendered less strict; i.e., the precision of drilling is appreciably reduced. Finally, the tapered and pointed end of the screw advantageously makes it possible to guide alignment thereof during insertion through the holes of the frame.

Of course, the details of construction and the embodiments may vary widely with respect to what is described and illustrated herein, without thereby departing from the scope of the present invention as defined in the ensuing claims.

What is claimed is:

1. An accessory and frame system for fixing an accessory on a metal frame for doors and, windows, the system including;

a screw having a head and a self-tapping threaded stem;

an accessory and a frame having adjacent walls formed with corresponding coaxial circular through holes respectively for insertion of the screw and for screwing of said self-tapping stem;

said self-tapping stem of the screw having a thread with a constant pitch;

an end of said self-tapping stem opposite to said head of the screw being conical;

a ratio between the external diameter of the self-tapping stem of the screw and the diameter of the through hole of said wall of the frame is between about 1.4 and 1.25; and a ratio between the diameter of the through hole of said wall of the frame and the thickness of said wall is between about 2.5 and 5.5; and wherein said screw has a guide portion having a cylindrical surface between said head and said self-tapping stem.

2. The system according to claim 1, wherein said self-tapping stem of the screw has an external diameter between 8 and 12 mm, and said through hole of said wall of the frame has a diameter between 5 and 9 mm.

3. The system according to claim 2, wherein a thickness of said wall of the frame is between 1.5 and 2.5 mm.

4. The system according to claim 2, wherein a thickness of a wall of the frame is between 1.6 and 2.1 mm.

5. The system according to claim 1, wherein said self-tapping stem of said screw has an external diameter of about 10 mm and said through hole of said wall of the frame has a diameter of about 7 mm.

6. The system according to claim 5, wherein a thickness of said wall of the frame is between 1.5 and 2.5 mm.

7. The system according to claim 5, wherein a thickness of said wall of the frame is between 1.6 and 2.1 mm.

8. The system according to claim 1, wherein said self-tapping stem of said screw has an external diameter of about 10 mm, and said through hole of said wall of the frame has a diameter between 7.5 and 8 mm.

9. The system according to claim 8, wherein a thickness of said wall of the frame is between 1.5 and 2.5 mm and preferably between 1.6 and 2.1 mm.

10. The system according to claim 1, wherein said frame has a second wall with a second circular through hole identical to said hole of said wall and coaxially aligned thereto, said wall and said second wall being set at a distance from one another shorter than the length of said self-tapping stem of the screw.

11. The system according to claim 10, wherein said frame has a third wall with a third circular through hole identical to said hole of said wall and coaxially aligned thereto, said third wall being set at a distance from said wall substantially equal to the length of said self-tapping stem of said screw decreased by the length of said tapered end to provide for final engagement of the latter within said third hole.

12. The system according to claim 1, wherein the thread of said self-tapping stem of said screw has a pitch between 1.2 and 1.7 mm.

13. The system according to claim 12, wherein the thread of said self-tapping stem of said screw has flanks forming an angle of 60°.

14. The system according to claim 1, wherein said screw has a total length between 40 and 60 mm.

15. The system according to claim 1, wherein said metal frame is made of aluminium or its alloys.

16. The system according claim 1, wherein said accessory is a hinge.

17. The system of claim 1, wherein the ratio between the diameter of the through hole of said wall of the frame and the thickness of said wail is between 3 and 5.

* * * * *